US011451623B2

(12) United States Patent
Zarifis et al.

(10) Patent No.: US 11,451,623 B2
(45) Date of Patent: *Sep. 20, 2022

(54) SYSTEMS AND METHODS FOR DYNAMIC LOAD BALANCING BASED ON SERVER UTILIZATION AND CONTENT POPULARITY

(71) Applicant: Verizon Digital Media Services Inc., Dulles, VA (US)

(72) Inventors: Kyriakos Zarifis, Los Angeles, CA (US); Harkeerat Singh Bedi, Los Angeles, CA (US); Donnevan Scott Yeager, Anderson Island, WA (US); Derek Shiell, Santa Monica, CA (US)

(73) Assignee: Edgecast Inc., Dulles, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/329,981

(22) Filed: May 25, 2021

(65) Prior Publication Data

US 2022/0131933 A1 Apr. 28, 2022

Related U.S. Application Data

(63) Continuation of application No. 17/079,981, filed on Oct. 26, 2020, now Pat. No. 11,025,710.

(51) Int. Cl.
*H04L 67/1008* (2022.01)
*H04L 67/1012* (2022.01)
*H04L 67/1031* (2022.01)
*H04L 67/1029* (2022.01)

(52) U.S. Cl.
CPC ...... *H04L 67/1008* (2013.01); *H04L 67/1012* (2013.01); *H04L 67/1029* (2013.01); *H04L 67/1031* (2013.01)

(58) Field of Classification Search
None
See application file for complete search history.

(56) References Cited

U.S. PATENT DOCUMENTS 6,003,030 A * 12/1999 Kenner ............... H04N 21/6543
6,078,960 A *  6/2000 Ballard ............... H04L 67/1019
                                                        709/239
6,112,239 A *  8/2000 Kenner ............... H04L 67/1001
                                                        709/224

(Continued)

*Primary Examiner* — Backhean Tiv
(74) *Attorney, Agent, or Firm* — Ansari Katiraei LLP; Arman Katiraei; Sadiq Ansari

(57) ABSTRACT

Provided is a controller for dynamically balancing load between different servers using different thresholds that are continually modified for each of the servers. The controller may generate a baseline load measure based on load measures received from the different servers, and may configure a first threshold for a first server and a second threshold for a second server based on the load measure at the first server deviating from the baseline load measure by a first amount that is greater than a second amount by which the load measure at the second server deviates from the baseline load measure. The controller may allocate an additional server to distribute first content with the first server in response to first content load at the first server satisfying the first threshold and the same load or a greater load of second content at the second server not satisfying the second threshold.

20 Claims, 7 Drawing Sheets

(56) References Cited

U.S. PATENT DOCUMENTS

| | | | | |
|---|---|---|---|---|
| 6,601,084 B1* | 7/2003 | Bhaskaran | | H04L 67/1034 718/105 |
| 7,657,629 B1* | 2/2010 | Kommula | | H04L 61/4511 709/226 |
| 8,296,434 B1* | 10/2012 | Miller | | H04L 67/1029 709/224 |
| 8,843,606 B2* | 9/2014 | McGregor | | H04L 67/62 717/171 |
| 8,949,410 B2* | 2/2015 | Patel | | H04L 67/1031 709/200 |
| 9,549,043 B1* | 1/2017 | Stoica | | H04L 65/612 |
| 9,979,674 B1* | 5/2018 | Kumar | | H04L 47/823 |
| 10,169,095 B2* | 1/2019 | Ding | | H04L 43/0882 |
| 10,601,768 B2* | 3/2020 | Flores | | H04L 61/4511 |
| 11,025,710 B1* | 6/2021 | Zarifis | | H04L 67/1031 |
| 2004/0216114 A1* | 10/2004 | Lin | | G06F 9/5083 718/105 |
| 2004/0267930 A1* | 12/2004 | Giulio | | H04L 67/1012 709/225 |
| 2005/0193113 A1* | 9/2005 | Kokusho | | H04L 67/1008 709/225 |
| 2007/0233866 A1* | 10/2007 | Appleby | | H04L 67/1008 709/226 |
| 2007/0260732 A1* | 11/2007 | Koretz | | H04L 67/1012 709/226 |
| 2010/0306368 A1* | 12/2010 | Gagliardi | | G06F 16/951 709/224 |
| 2011/0078318 A1* | 3/2011 | Desai | | H04L 67/1029 709/228 |
| 2011/0196908 A1* | 8/2011 | Sukthankar | | G06N 3/126 709/201 |
| 2011/0225300 A1* | 9/2011 | Kaneki | | G06F 9/5088 709/226 |
| 2012/0158971 A1* | 6/2012 | Takahashi | | H04L 67/1008 709/226 |
| 2012/0272025 A1* | 10/2012 | Park | | G06F 3/067 711/E12.103 |
| 2013/0204991 A1* | 8/2013 | Skjolsvold | | G06F 9/5083 709/223 |
| 2014/0280764 A1* | 9/2014 | Dasher | | H04L 65/60 709/219 |
| 2015/0026306 A1* | 1/2015 | Moon | | H04L 67/1029 709/219 |
| 2015/0106428 A1* | 4/2015 | Elias | | H04L 67/01 709/203 |
| 2016/0182399 A1* | 6/2016 | Zadka | | H04L 47/726 709/226 |
| 2016/0315862 A1* | 10/2016 | Shum | | H04L 47/125 |
| 2016/0337426 A1* | 11/2016 | Shribman | | H04L 65/612 |
| 2017/0019462 A1* | 1/2017 | Hara | | H04L 43/062 |
| 2018/0020048 A1* | 1/2018 | Seol | | H04L 67/1008 |
| 2018/0054477 A1* | 2/2018 | Chivukula | | H04L 67/1008 |
| 2018/0091619 A1* | 3/2018 | Power | | H04L 67/561 |
| 2018/0167461 A1* | 6/2018 | Shen | | G06F 9/5088 |
| 2018/0191799 A1* | 7/2018 | Chen | | H04L 65/70 |
| 2019/0215361 A1* | 7/2019 | Lohmar | | H04L 65/80 |
| 2020/0250595 A1* | 8/2020 | Palani | | H04L 41/147 |

* cited by examiner

SYSTEMS AND METHODS FOR DYNAMIC LOAD BALANCING BASED ON SERVER UTILIZATION AND CONTENT POPULARITY

CLAIM OF BENEFIT TO RELATED APPLICATIONS

This application is a continuation of U.S. nonprovisional application Ser. No. 17/079,981 entitled "Systems and Methods for Dynamic Load Balancing Based on Server Utilization and Content Popularity", filed on Oct. 26, 2020, now U.S. Pat. No. 11,025,710. The contents of application Ser. No. 17/079,981 are hereby incorporated by reference.

BACKGROUND

A Content Delivery Network ("CDN") or other distributed platform may have several Points-of-Presence ("PoPs"). The PoPs may be distributed to different network locations in order to localize the delivery and/or distribution of services, media, files, data, and/or other content to different geographically proximate sets of client devices. Each PoP may have multiple servers or server devices for caching and distributing requested content to a geographically proximate set of client devices.

To maximize the cache footprint of a PoP, the PoP may have a load balancer or director that persistently distributes requests for the same content to the same server in that PoP. The persistent distribution may result in a uniform distribution of content across the PoP servers, but the varying popularity of the content may result in an uneven distribution of load across the PoP servers. For instance, a first server in a PoP may be tasked with serving first content and second content, and a second server in the PoP may be tasked with serving third content and fourth content. The first server may receive 500 requests per second for each of the first content and the second content due to high demand for the first and second content, whereas the second server may receive less than 100 requests per second for each of the third content and the fourth content due to low demand for the third and fourth content. In this case, there is an unequal distribution of load between the first server and the second server despite a uniform distribution of content.

DETAILED DESCRIPTION OF PREFERRED EMBODIMENTS

The following detailed description refers to the accompanying drawings. The same reference numbers in different drawings may identify the same or similar elements.

Systems and methods, as described herein, provide dynamic load balancing based on server utilization and content popularity. The dynamic load balancing may include redistributing the load for a particular service, media, file, data, and/or other content (hereinafter interchangeably referred to as "content") from a first server to one or more other servers that are collocated and/or part of a common Point-of-Presence ("PoP") of a Content Delivery Network ("CDN") or other distributed platform by accounting for the actual load experienced by the first server, and by scaling (e.g., increasing or decreasing) the threshold for distributing first server load to other servers in the PoP based on the actual load experienced by the first server. In some embodiments, the dynamic load balancing may include monitoring the load for each server in a PoP, monitoring the popularity of different content served by each server, and dynamically setting different thresholds for each server to more aggressively classify content as popular content on a server with an overall load that is greater than the average, median, and/or relative load of the PoP servers, to less aggressively classify content as popular content on a server with an overall load that is less than the average, median, and/or relative load of the PoP servers, and to redistribute the load of the classified popular content across additional PoP servers.

Figure 1:
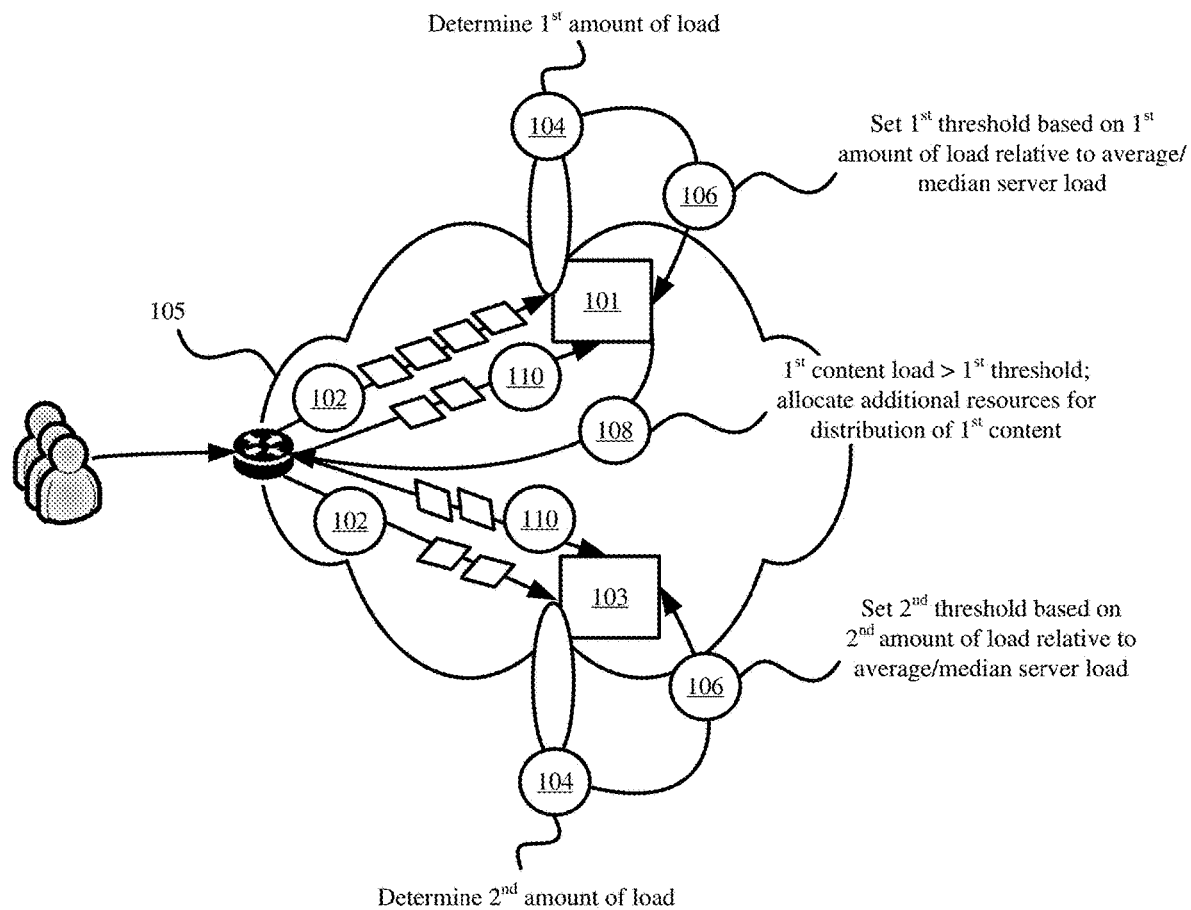
FIG. 1 illustrates an example of dynamic load balancing in accordance with some embodiments presented herein.

FIG. 1 illustrates an example of the dynamic load balancing in accordance with some embodiments presented herein. As shown in FIG. 1, first server 101 and second server 103 may be collocated in PoP 105. First server 101 and second server 103 may cache a uniformly distributed set of content in response to receiving (at 102) and/or responding to client device requests for different content, and may serve the cached content in response to subsequent requests for the same content.

The client device requests may place an unequal and greater first amount of load on first server 101 for the first set of content served by first server 101, and lesser second amount of load on second server 103 for the second set of content served by second server 103. In some embodiments, the first amount of load may be derived (at 104) from load statistics that first server 101 tracks in response to receiving and/or responding to the client device requests, and the second amount of load may be derived (at 104) from load statistics that second server 103 tracks in response to receiving and/or responding to the client device requests. For instance, the first amount of load may be quantified (at 104) based on first server 101 tracking the number of requests per second, the number of bytes served, and/or, more generally, the demand or amount of consumed resources (e.g., used capacity, used bandwidth, bytes served in a period of time, etc.) for each content of the first set of content.

A delta or amount of deviation between the first amount of load and the second amount of load may provide an indication of the degree or severity for the uneven load distribution in PoP 105. In some embodiments, the distribution of load across PoP 105 may be determined from the first amount of load and the second amount of load. The average, median, and/or other relative measure of individual server load in PoP 105 may be computed from the individual load at each server of PoP 105 and the total number of servers in PoP 105. The distribution of load to first server 101 may then be determined by comparing the first amount of load to the average, median, and/or other relative measure of the individual server load, and the distribution of load to second server 103 may be determined by comparing the second amount of load to the average, median, and/or other relative measure of the individual server load.

To ameliorate the uneven load distribution, first server 101 may configure (at 106) and/or use a more aggressive and/or lower first threshold to classify content within the first set of content as "hot" or popular content that requires additional PoP 105 resources for distribution (e.g., additional servers for distribution), and second server 103 may configure (at 106) and use a less aggressive and/or higher second threshold to classify content within the second set of content as hot or popular content.

First server 101 may compare the individual load contributed by each content of the first set of content against the first threshold. In response to the individual load of first content in the first set of content satisfying or exceeding the first threshold and/or being classified as hot content using the first threshold, first server 101 may enable (at 108) "hotfiling" for the first content.

Enabling (at 108) hotfiling for the first content may include allocating at least one other server or resource in PoP 105 to offload part of the first content demand from first server 101. As shown in FIG. 1, PoP 105 may scale the resources used to distribute the first content by adding second server 103 in addition to first server 101 as resources for receiving first content requests and serving the first content to requesting client devices. Consequently, after hotfiling is enabled (at 108) for the first content, subsequent requests for the first content are distributed (at 110) between first server 101 and second server 103, thereby dividing the first content load between first server 101 and second server 103.

Similarly, second server 103 may compare the individual load contributed by each content of the second set of content against the different second threshold. In this example, the loads imposed by the different content of the second set of content on second server 103 does not satisfy or exceed the second threshold. Accordingly, second server 103 may continue responding to requests for the second set of content as well as the shifted subset of requests for the first content, thereby providing a more balanced distribution of load across PoP 105.

Figure 2:
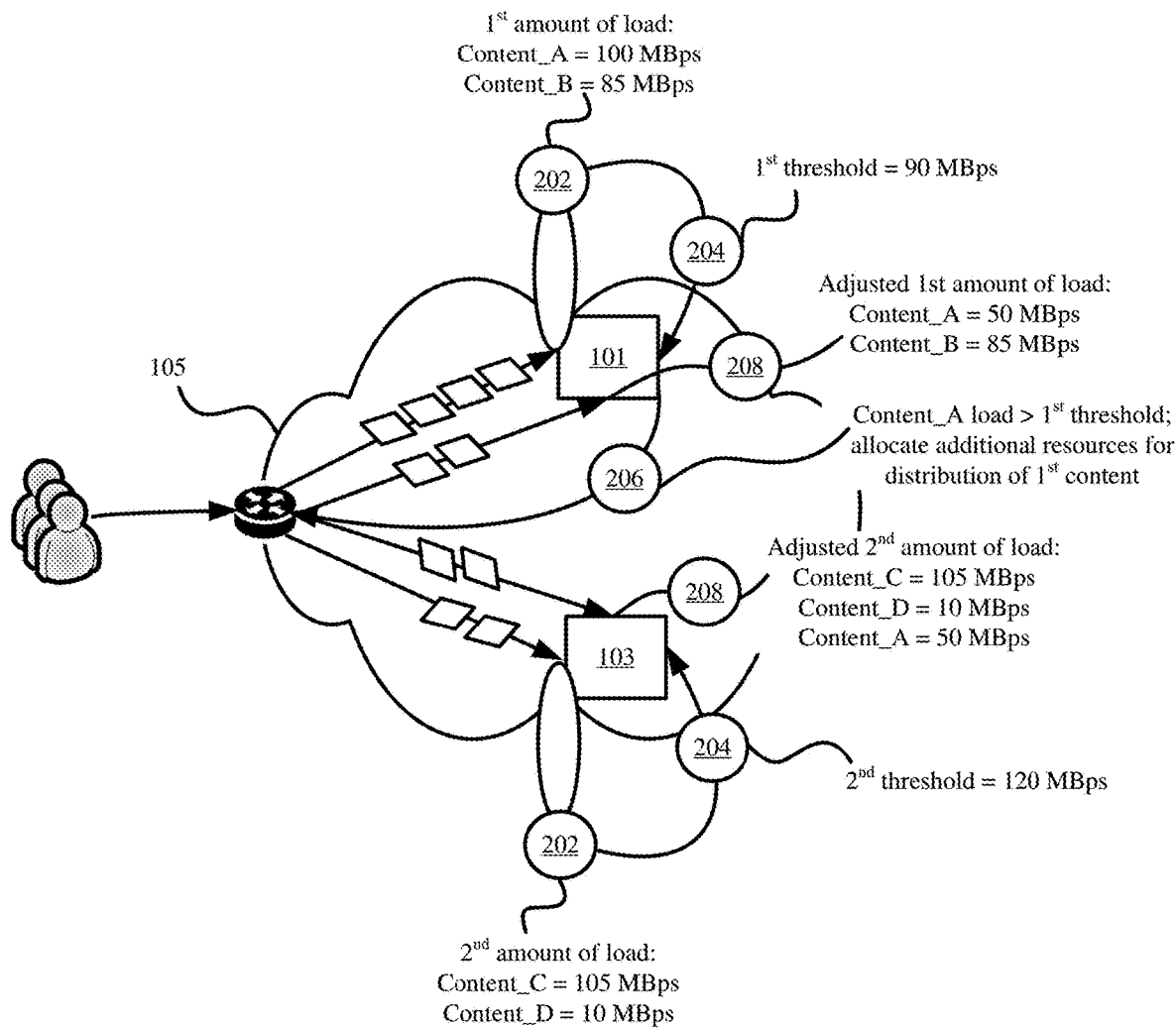
FIG. 2 illustrates an example of redistributing load based on different dynamic thresholds that are set for different servers in accordance with some embodiments presented herein.

FIG. 2 illustrates an example of redistributing load based on the different dynamic thresholds set for each of first server 101 and second server 103 in accordance with some embodiments presented herein. As shown in FIG. 2, first server 101 may track (at 202) 100 Megabytes per second ("MBps") of load from first content that is served by first server 101, and 85 MBps of load from second content that is served by first server 101. Second server 103 may track (at 202) 105 MBps of load from third content that is served by second server 103, and 10 MBps of load from fourth content that is served by second server 103. Accordingly, total load on first server 101 may be 185 MBps, and total load on second server 103 may be 115 MBps.

Assuming that first server 101 and second server 103 have the same or similar total capacity or load overhead, a lower first threshold of 90 MBps may be set (at 204) for first server 101, and a higher second threshold of 120 MBps may be set (at 204) for second server 103 due to the greater overall load on first server 101 relative to second server 103. First server 101 may determine (at 206) that the 100 MBps load imposed by the first content exceeds the 90 MBps first threshold, and may initiate (at 206) a redistribution of the first content load by adding second server 103 as a second server for handling half and/or a subset of the requests or demand for the first content. Even though the third content imposes a higher individual load of 105 MBps on second server 103, the lower overall load on second server 103 and the resulting higher second threshold of 120 MBps may keep all the load of the third content on second server 103 until the load of the third content meets or exceeds 120 MBps.

After adding second server 103 to handle part of the first content load, the total overall load on first server 101 may drop (at 208) to 135 MBps (e.g., 50 MBps from the first content and 85 MBps from the second content), and the total overall load on second server 103 may increase (at 208) to 165 MBps (e.g., 105 MBps from the third content, 10 MBps from the fourth content, and 50 MBps from the first content). Accordingly, the load redistribution lowers the delta in the overall load between first server 101 and second server 103 from 70 MBps (e.g., 185 MBps total load on first server 101 less 115 MBps total load on second server 103) to 30 MBps (e.g., 135 MBps total load on first server 101 less 165 MBps total load on second server 103).

The remaining unevenness in the load distribution may be further reduced in subsequent iterations of the dynamic load balancing. In particular, shifting load from the first server 101 to second server 103 may increase the overall load on the second server 103, and, in turn, may lower the second threshold at which load may be shifted away from second server 103.

In any case, the dynamic thresholds provided by the dynamic load balancing set forth herein result in a more even distribution than when using static thresholds. For instance, traditional hotfiling implementations may set a static threshold of 105 MBps for any content served by any server in a PoP. With the static threshold configured for all servers in PoP 105, the first content load of 100 MBps would not trigger the static threshold, and no load would be distributed off of first server 101. However, the third content load of 105 MBps would trigger the static threshold, and would cause the third content load to be partially redistributed from second server 103 to first server 101. Consequently, the static thresholds may cause the overall load on first server 101 to increase from 185 MBps to 237.5 MBps (e.g., 100 MBps from the first content, 85 MBps from the second contend, and 52.5 MBps from the third content). Accordingly, the dynamic load balancing and the dynamic thresholds that are derived for each server in some embodiments provide a more even load distribution than a static threshold that is uniformly set for all servers and/or all content without any consideration for the actual load on each of the servers.

Figure 3:
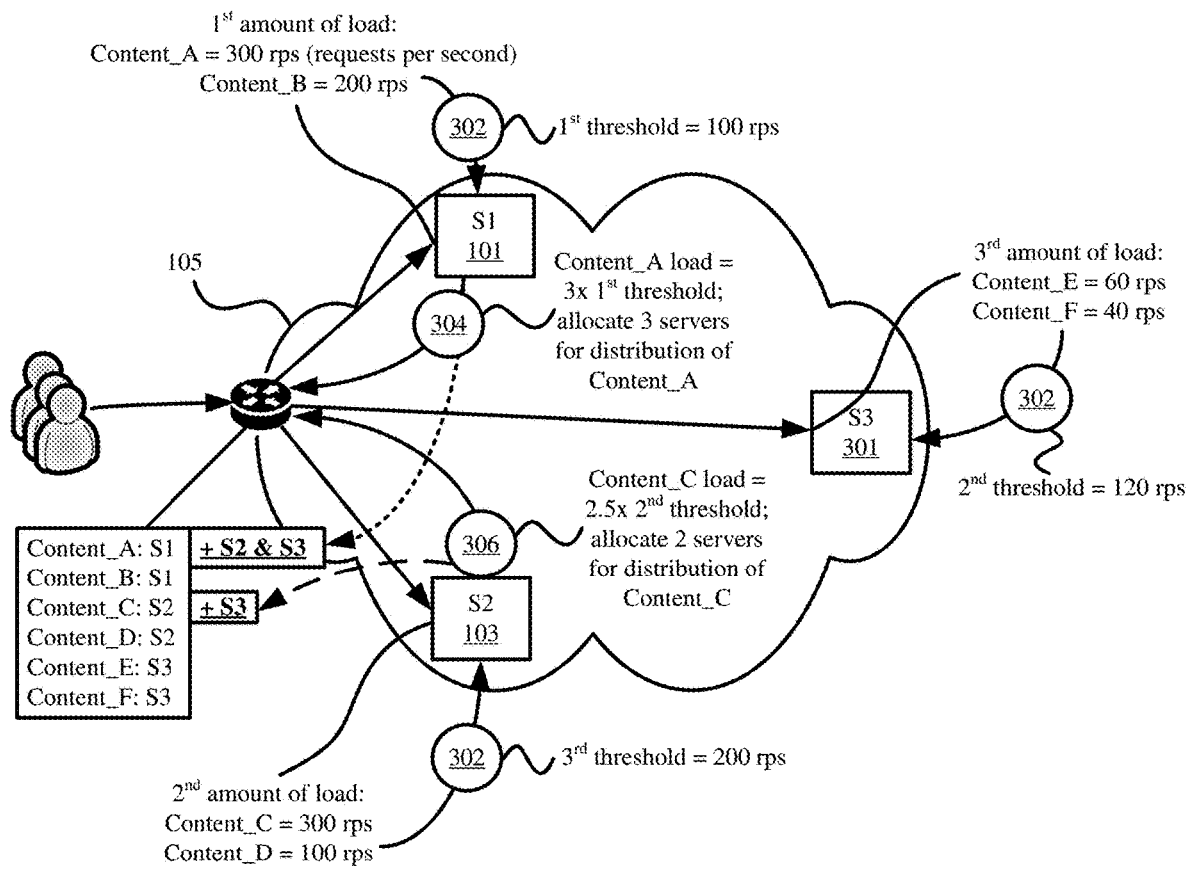
FIG. 3 illustrates an example of dynamically scaling the resources used to distribute hot content based on the dynamic thresholds in accordance with some embodiments.

In some embodiments, the dynamic thresholds may also be used to dynamically scale the allocation of resources for distributing hot content. FIG. 3 illustrates an example of dynamically scaling the resources used to distribute hot content based on the dynamic thresholds in accordance with some embodiments.

As shown in FIG. 3, PoP 105 may include first server 101, second server 103, and third server 301. First server 101 may initially be tasked with distributing a first set of content, second server 103 may initially be tasked with distributing a second set of content, and third server 301 may initially be tasked with distributing a third set of content. The first set of content may impose an overall load of 500 requests per second on first server 101, the second set of content may impose an overall load of 400 requests per second on second server 103, and the third set of content may impose an overall load of 100 requests per second on third server 301. In particular, the first content of the first set of content and the second content of the second set of content may receive heavy demand relative to other content being distributed from PoP 105. As a result, PoP 105 has an uneven load distribution with first server 101 and second server 103 handling a disproportionate number of requests due to the popularity of the first content and the second content.

In response to the uneven load distribution across PoP 105, different dynamic thresholds may be set (at 302) for each of first server 101, second server 103, and third server 301. As shown in FIG. 3, first server 101 may be configured (at 302) with a first threshold of 100 requests per second due to first server 101 experiencing the greatest load, second server 103 may be configured (at 302) with a second threshold of 120 requests per second, and third server 301 may be configured (at 302) with a third threshold of 200 requests per second due to third server 301 experiencing the least load.

The first content may contribute 300 requests per second to the overall load on first server 101, and may exceed the first threshold by 3 times. In some embodiments, the multiple by which load for particular content exceeds a threshold (e.g., 3) may be used to determine the number of servers to use for the distribution of that particular content. Accordingly, first server 101 may invoke (at 304) hotfiling for the first content, and second server 103 and third server 301 may be added for the distribution of the first content so that each of first server 101, second server 103, and third server 301 receive ⅓ or 100 requests per second of the first content load.

The second content, that is served by second server 103, may also contribute 300 requests per second to the overall load on second server 103. However, the second threshold set for second server 103 is larger than the first threshold set for first server 101. Consequently, the second content load contribution may exceed the second threshold by 2.5 times, and second server 103 may invoke (at 306) hotfiling for the second content by adding one additional server for the distribution of the second content. In this case, third server 301 may be selected to supplement the distribution of the second content by second server 103, and third server 301 may receive half of the subsequent requests for the second content (e.g., 150 requests per second).

Despite the first content and second content accounting for the same amount of load (e.g., 300 requests per second), the dynamic scaling of servers or content distribution resources shown in FIG. 3 is based on the different dynamic thresholds that are set for each server based on the different aggregate loads on the different servers. The dynamic scaling therefore results in a different redistribution of load for each of the first content and the second content. Specifically, since a total of 3 servers are allocated to distribute the first content, first server 101 is left with 100 of the 300 requests per second of the first content to distribute, whereas 2 servers are allocated to distribute the second content, leaving second server 103 with 150 of the 300 requests per second of the second content to distribute. In other words, the dynamic load balancing and the dynamic thresholds provided a larger redistribution of the first content load from first server 101 than the second content load from second server 103 despite the first content and the second content imposing equal amounts of load on PoP 105.

Figure 4:
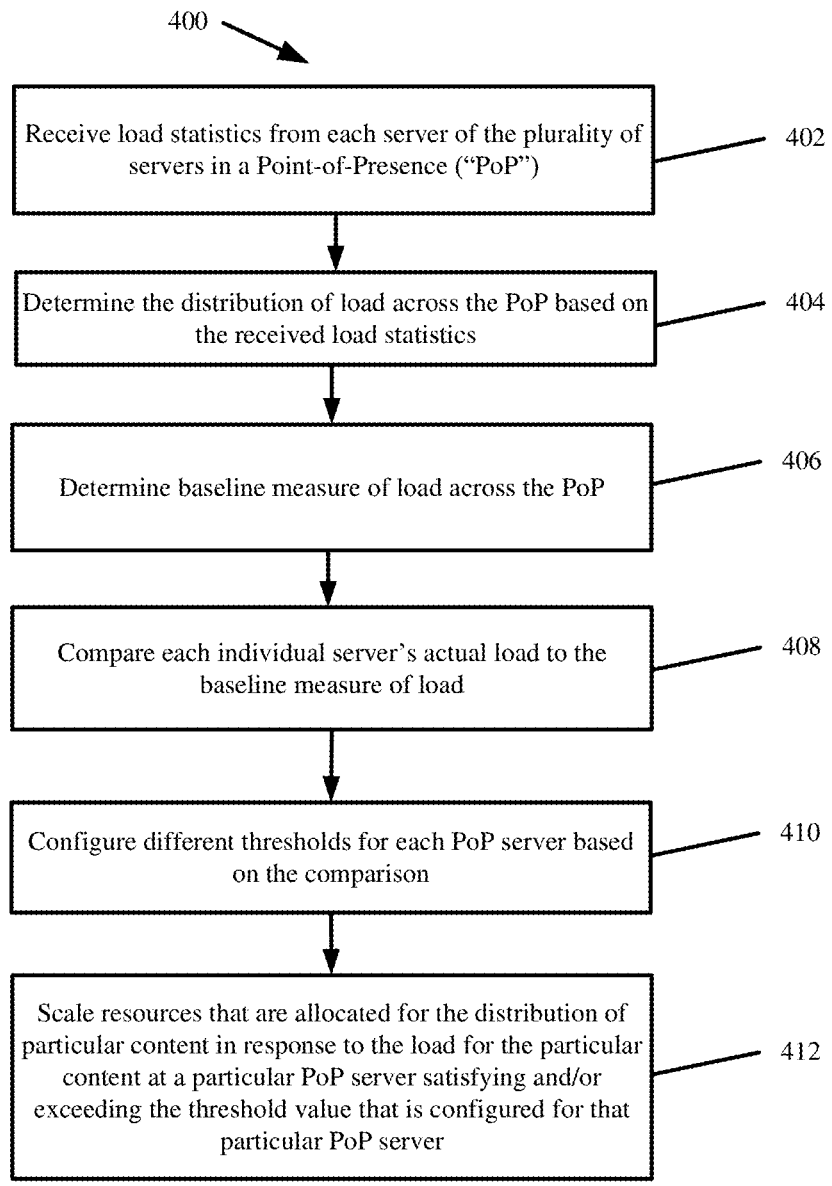
FIG. 4 presents a process for performing the dynamic load balancing using server utilization and content popularity to set different dynamic hotfile thresholds in accordance with some embodiments presented herein.

FIG. 4 presents a process 400 for performing the dynamic load balancing using server utilization and content popularity to set different dynamic hotfile thresholds in accordance with some embodiments presented herein. Process 400 may be implemented by any of a load balancer, request director, server, and/or any other device operating in a PoP with a plurality of different servers that collectively serve different sets of content to requesting client devices.

Process 400 may include receiving (at 402) load statistics from each server of the plurality of servers in the PoP. In some embodiments, the PoP servers may be configured to periodically push their load statistics to a destination in the PoP that corresponds to the PoP device implementing process 400. For instance, the PoP servers may provide updated load statistics to a particular server in the PoP about every 1 second. In some embodiments, the particular server may pull or otherwise retrieve the load statistics from the PoP servers using different request messaging.

The load statistics may indicate the number of requests per time interval that each server receives for different content, the number of bytes served for different content over a particular time interval, and/or other metrics related to the load associated with different content being served from a PoP server. To reduce intra-PoP traffic and/or the computational overhead on each of the plurality of PoP servers, the load statistics may be filtered to include the load statistics for a most popular set of content distributed by each server. For instance, each server may store a table that tracks the number of requests received by that server over the particular time interval. The server may sort the table to identify the top 10 or top 20 most requested content, and may provide the load statistics for the top 10 or 20 most requested content, rather than for all content. The load statistics for the most popular set of content may sufficiently represent the overall load on the server as the most popular set of content may account for the majority of the load on that server, while the other less popular content may account for an insignificant fraction of load on that server.

Process 400 may include determining (at 404) the distribution of load across the PoP based on the received (at 402) load statistics. In some embodiments, determining (at 404) the load distribution may include summing the aggregate load at each server of the PoP. In some such embodiments, the load statistics provided by each server may include the load associated with a subset of the most popular content at the server, and the total PoP load may be based on the aggregate loads from the subset of the most popular content at each server. In some other embodiments, determining (at 404) the load distribution may include determining the ordering of each server's load using the received (at 402) load statistics.

Process 400 may include determining (at 406) a baseline measure of load across the PoP. The baseline measure of load across the PoP may correspond to an average, median, and/or another relative measure for the load distribution across the PoP. As noted above, the load statistics from each server may identify the request counts, byte transmission rate, and/or other data regarding requests and/or distribution of the most popular set of content comprising the bulk of the load on that server. Accordingly, the average and/or median server load may be determined (at 406) from ordering the received load statistics and/or performing some computation on the load statistics.

Process 400 may include comparing (at 408) each individual server's actual load, as provided in the load statistics collected from that server, to the baseline measure of load (e.g., the median server load). In particular, the total number of requests per second at one server may be compared (at 408) against the median number of requests per second for the PoP servers in order to generate a value for the proportion of the PoP load that is being handled by that first server.

For instance, a first server in a PoP may provide load statistics indicating the first server receiving 100 requests per second for first content and 50 requests per second for second content, and a second server in the PoP may provide load statistics indicating the second server receiving 75 requests per second for the second content and 35 requests per second for third content. In this example, the average requests per second for the PoP servers may be 130 requests per second (e.g., (100+50+75+35)/2), the proportion of the PoP load at the first server may be 1.15 (e.g., 150 total requests per second at the first server/130 average requests per second), and the proportion of the PoP load at the second server may be 0.85 (e.g., 110 total requests per second at the second server/130 average requests per second).

Process 400 may include configuring (at 410) different thresholds for each PoP server based on the comparison (at 408). Continuing with the example from above, process 400 may include configuring (at 410) a first threshold value of 113 requests per second for the first server by dividing the average of 130 requests per second by 1.15 for the value representing the proportion of the PoP load at the first server. Similarly, process 400 may include configuring (at 410) a different second threshold value of 153 requests per second for the second server by dividing the average of 130 requests per second by the 0.85 for the value representing the proportion of the PoP load at the second server.

As will be discussed in detail below, configuring (at 410) the different thresholds may include determining a weight value for each PoP server based on the comparison (at 408), and using the weight value to adjust a baseline threshold. For instance, if a first server experiences a load that is twice the median server load, configuring (at 410) the different thresholds may include dividing an example baseline threshold of 200 requests per second by the weight value of 2 to set a threshold of 100 requests per second for the first server (e.g., 200 requests per second/2). Similarly, if a second server experiences a load that is half the median load of the PoP servers, configuring (at 410) the different thresholds may include dividing the baseline threshold of 200 requests per second by the weight value of 0.5 to set a threshold of 400 requests per second for the second server. In some such embodiments, the configured threshold for a particular server may be inversely proportional to the current load at that particular server.

In some embodiments, configuring (at 410) the different thresholds may include providing intra-PoP messaging with the different thresholds from a controller or other device performing process 400 to the different PoP servers, and the PoP servers continuing operation based on the configured (at 410) thresholds. In some such embodiments, the controller may control the different thresholds that are used by each of the PoP servers. In some other embodiments, configuring (at 410) the different thresholds may include setting different thresholds for different PoP servers at the controller, and determining, at the controller, whether distribution resources for any particular content should be increased by comparing the threshold that is set for a particular PoP server to the load statistics that are received (at 402) from that particular PoP server.

In some embodiments, two or more different thresholds may be configured (at 410) for each PoP server. The different thresholds may be derived from different load statistics or different measures of server utilization and/or load. For instance, a first threshold may be set for the number of bytes served over a time interval (e.g., MBps), and a second threshold may be set for the number of requests received over the time interval (e.g., requests per second). By configuring (at 410) the two or more different thresholds for each PoP server, the dynamic load balancing may account for the content size and content popularity. For instance, larger size content, that is requested less than smaller size content, may not satisfy the requests per second threshold, but may impose a heavier load on a server than more frequently requested smaller size content due to the greater amount of bandwidth required to respond to each request for the larger size content. Accordingly, a second threshold based on the number of bytes served per interval of time may be set, and may be used to redistribute the load from the larger size content across multiple servers.

Process 400 may include dynamically scaling (at 412) PoP resources that are allocated for the distribution of particular content in response to the load for the particular content at a particular PoP server satisfying and/or exceeding the threshold value that is configured (at 410) for that particular PoP server. Dynamically scaling (at 412) the PoP resources may include determining the scaler value or multiple by which content load for particular content at a particular PoP server exceeds the dynamic threshold that is configured (at 410) for that particular PoP server, and adding additional PoP servers to assist in the distribution of the particular content based on the scaler value or multiple. For instance, if the actual load for the particular content exceeds the threshold by 2-2.9 times, then one additional server may be added to aid in the distribution of the particular content, and if the actual load for the particular content exceeds the threshold 3-3.9 times, then two additional servers may be added to aid in the distribution of the particular content.

In some embodiments, dynamically scaling (at 412) the PoP resources may include adding the identifier for one or more PoP servers that are added to distribute part of the load for particular content to a load balancer and/or director that controls the distribution of requests for the particular content across the PoP. In particular, the load balancer and/or director may receive all requests entering the PoP. The load balancer and/or director may hash a Uniform Resource Locator ("URL") and/or other identifiers for the requested content in each received request in order to determine which PoP servers are currently allocated to distribute the requested content, and may forward and/or otherwise provide the request to one of the allocated servers according to a round-robin or other distribution. The load balancer and/or director may store a hash table that identifies different servers that are allocated for the distribution of different content, and may add or remove server identifiers from the hash table as the resources are dynamically scaled.

Figure 5:
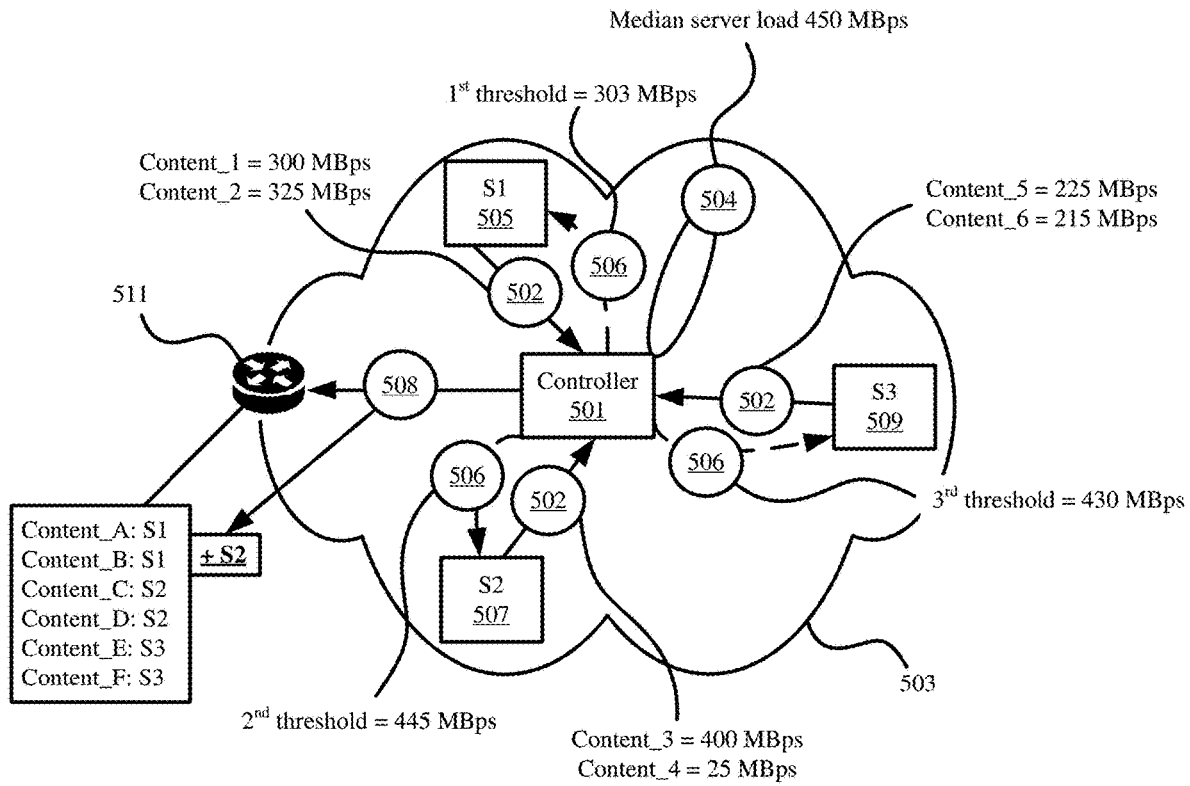
FIGS. 5 and 6 illustrate an example of a controller controlling the allocation of content distribution resources in a Point-of-Presence ("PoP") based on dynamic thresholds that change according to changing server utilization in accordance with some embodiments presented herein
Figure 6:
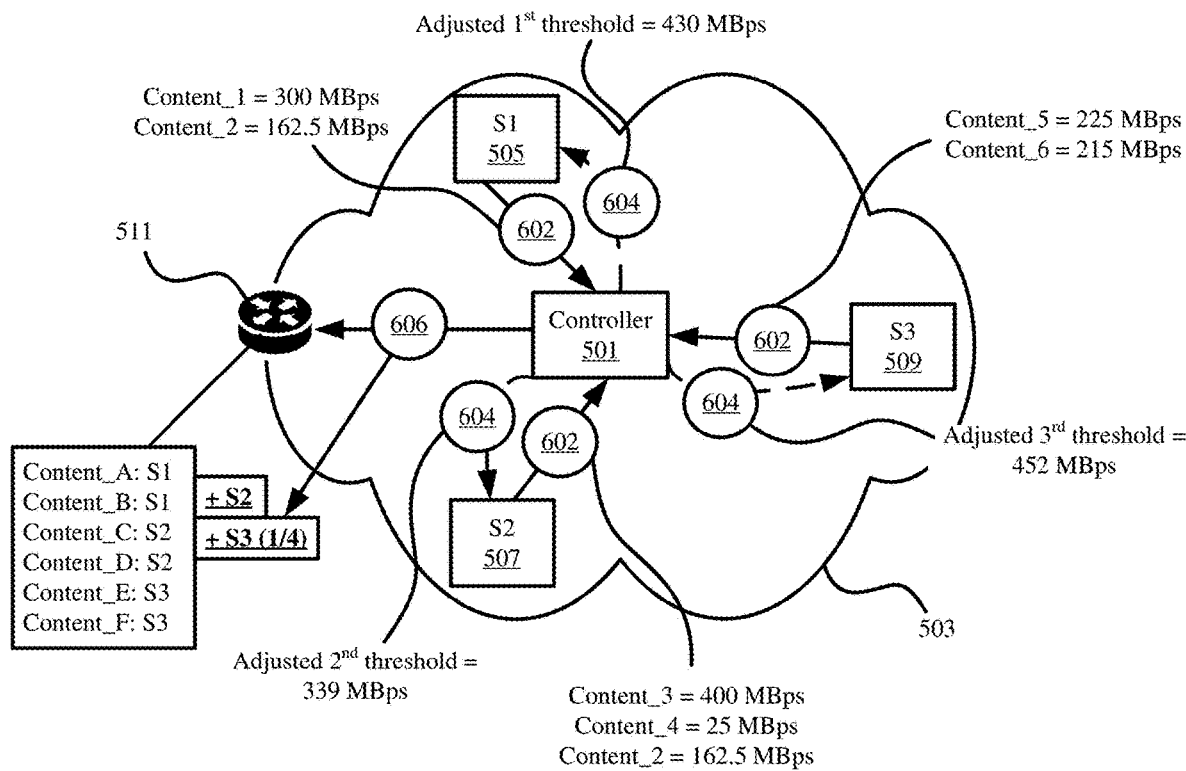

FIGS. 5 and 6 illustrate an example of controller 501 controlling the allocation of content distribution resources in PoP 503 based on dynamic thresholds that change according to changing server utilization in accordance with some embodiments presented herein. As shown in FIG. 5, PoP 503 may include controller 501, first server 505, second server 507, third server 509, and director 511.

In some embodiments, controller 501 may be integrated to run as part of one of first server 505, second server 507, or third server 509 that receives and responds to requests for content. In some other embodiments, controller 501 may be integrated to run as part of director 511. In still some other embodiments, controller 501 may include a device that operates independent of servers 505, 507, and 509 and director 511. In any event, first server 505, second server 507, and third server 509 may be configured to periodically provide load statistics to controller 501, and/or controller

501 may be communicably coupled to director 511 in order to modify the request routing configuration of director 511.

As shown in FIG. 5, controller 501 may periodically collect (at 502) load statistics from first server 505, second server 507, and third server 509. Each of first server 505, second server 507, and third server 509 may be configured with the Internet Protocol ("IP") address or other network address of controller 501, and may be further configured to provide (at 502) the load statistics at a regularly occurring interval (e.g., every 1 second, every 5 seconds, etc.).

Controller 501 may determine (at 504) the average and/or median load from the collected (at 502) load statistics of each server 505, 507, and 509. For instance, the load statistics from first server 505 may indicate first server 505 distributing 300 MBps of data for first content and 325 MBps of data for second content, the load statistics from second server 507 may indicate second server 507 distributing 400 MBps of data for third content and 25 MBps of data for fourth content, and the load statistics from third server 509 may indicate third server 509 distributing 225 MBps of data for fifth content and 215 MBps of data for sixth content. From the example load statistics, controller 501 may determine (at 504) a median server load of 440 MBps.

Controller 501 may determine that first server 505 is disproportionately serving 1.42 times the median server load (e.g., 625 MBps/440 MBps) despite each server 505, 507, and 509 initially being tasked with persistent distribution of two different items of content. This disproportionate load on first server 505 may be due to the varying demand for the content served by each of the servers. This imbalanced distribution of load may cause first server 505 to be less resilient to surges, may operate closer to its limit or capacity, and/or may suffer performance degradation should the first and second content or any other content being served by first server 505 receive a surge in demand.

To better balance the load distribution across first server 505, second server 507, and third server 509, controller 501 may configure (at 506) a first threshold of 303 MBps for first server 505 by dividing a baseline threshold of 430 MBps by first server's 505 load proportion of 1.42, may configure a second threshold of 445 MBps for second server 507 by dividing the baseline threshold by second server's 507 load proportion of 0.97, and may configure a third threshold for third server 509 that is equal to the baseline threshold. In some embodiments, controller 501 may generate a weight value for each server based on the load proportion experienced by that server, and may configure (at 506) the threshold by multiplying the generated weight value to the baseline threshold.

Controller 501 may compare individual loads at first server 505 for the first content and the second content to the first threshold, and may determine that the individual load for the second content exceeds the first threshold (e.g., 325 MBps for the second content>303 MBps set for the first threshold). Controller 501 may reference the load statistics provided (at 502) by first server 505 to determine the individual loads for the first content and the second content.

In response to determining that the individual load for the second content exceeds the first threshold, controller 501 may allocate (at 508) additional resources for the distribution of the second content. Allocating (at 508) the additional resources may include modifying a routing configuration of director 511 to include one of second server 507 or third server 509 in the distribution of requests for the second content.

In some embodiments, controller 501 and/or director 511 may perform (at 508) an intelligent allocation of resources to facilitate a more balanced load distribution when scaling the resources used to distribute particular content. For instance, controller 501 may reference the load statistics that are received (at 502) from each server of the PoP 503 and/or the derived values representing the amount by which each server deviates from the server median load. Controller 501 may determine that second server 507 is the least utilized server in PoP 503, and may modify (at 508) the routing configuration of director 511 to add second server 507 as another resource for distributing the second content. In some other embodiments, first server 505 may directly modify the routing configuration of director 511 to add another server in the PoP 503 for the distribution of the second content.

Controller 501 may determine that the individual load for the content being distributed by second server 507 and third server 509 do not satisfy or exceed the second threshold set for second server 507 or the third threshold set for third server 509 respectively. Accordingly, no other changes are made to the routing configuration of director 511 during the illustrated dynamic load balancing iteration.

In response to modifying (at 508) the routing configuration of director 511, director 511 may begin providing half of the second content requests to first server 505, and the other half of the second content requests to second server 507, thereby distributing the second content load between first server 505 and second server 507. In response to receiving a first request for the second content at second server 507, second server 507 may perform a peer cache fill operation in which second server 507 retrieves a copy of the second content from first server 505. Alternatively, second server 507 may retrieve a copy of the second content from a remote origin source. In any case, second server 507 may cache the obtained copy of the second content in local cache (e.g., storage or memory), and may respond to all subsequent requests for the second content using the locally cached copy. The resulting load on first server 505 may be 300 MBps of data for the first content and 162.5 MBps of data for the second content (e.g., aggregate load of 462.5 MBps), the resulting load on second server 507 may be 400 MBps of data for the third content, 25 MBps of data for the fourth content, and 162.5 MBps of shifted data for the second content (e.g., aggregate load of 587.5 MBps), and the resulting load on third server 509 may be 225 MBps of data for the fifth content and 215 MBps of data for the sixth content (e.g., aggregate load of 440 MBps). The resulting aggregate load at each server in PoP 503 provides a more balanced distribution of the overall load with a smaller discrepancy between the heaviest loaded server (e.g., 625 MBps at first server 505 before the load redistribution and 587.5 MBps at second server 507 after the load distribution) and the least loaded server (e.g., 425 MBps at second server 507 before the load redistribution and 440 MBps at third server 509 after the load distribution).

Controller 501 may perform additional iterations of the dynamic load balancing to account for the redistributed load, the change in the dynamic thresholds that result from the redistributed load, and/or additional shifts of load that may be triggered as a result of the redistributed load and changed dynamic thresholds. More generally, controller 501 may continue performing the dynamic load balancing in order to further balance the load distribution.

FIG. 6 illustrates an iteration of the dynamic load balancing that follows the load distribution of FIG. 5. As shown in FIG. 6, controller 501 may collect (at 602) modified load statistics from first server 505, second server 507, and third server 509 that result after modifying (at 508) the routing configuration of director 511 and redistributing the second content load between first server 505 and second server 507.

Controller 501 may adjust (at 604) the different thresholds set for each server 505, 507, and 509 based on the different loads at each server 505, 507, and 509. Controller 501 may adjust (at 604) the different thresholds to ensure that the load remains balanced and/or to account for any disproportionate load that results from scaling the resources and/or shifting load for different content to different servers of PoP 503. In some embodiments, adjusting (at 604) the different thresholds may include replacing a previous threshold having a first value with a new threshold having a different and/or adjusted second value.

As shown in FIG. 6, controller 501 may dynamically increase the first threshold from 303 MBps to 430 MBps, may decrease the second threshold from 445 MBps to 339 MBps, and may increase the third threshold from 430 MBps to 452 MBps. In other words, controller 501 may replace the first threshold with the baseline threshold, may replace the second threshold with another threshold set at 339 MBps, and may replace the third threshold with another threshold set at 452 MBps due to deviations between each server's actual load and the updated median server load that results from shifting part of the second content load from first server 505 to second server 507.

The third content load at second server 507 may exceed the adjusted second threshold value (e.g., 400 MBps>339 MBps), causing controller 501 to allocate (at 606) additional resources for the distribution of the third content. Controller 501 may determine that third server 509 is now the least loaded server, and may add third server 509 as an additional resource for distributing the third content. As part of adding third server 509 for the distribution of the third content, controller 501 may determine that the load discrepancy between the most loaded server (e.g., second server 507) and the least loaded server (e.g., third server 509) is less than a specified amount. Accordingly, rather than equally divide the third content load between second server 507 and third server 509, controller 501 may modify the routing configuration of director 511 so that ¾ of the third content requests are provided to second server 507, and the other ¼ of the third content requests are provided to third server 509, thereby arriving at an even more balanced load distribution across all servers of PoP 503. Specifically, as a result of the third content redistribution after the first content redistribution, first server 505 may experience 462.5 MBps of aggregate load, second server 507 experience receive 487.5 MBps of aggregate load, and third server 509 may receive 540 MBps of aggregate load.

In some embodiments, modifying (at 508 and/or 606) the routing configuration of director 511 may include adding a time-to-live ("TTL") and/or expiration timer when adding resources for the distribution of particular content. While the TTL and/or expiration timer is valid, director 511 may distribute requests for the particular content between whichever resources are specified for the distribution of the particular content. However, once the TTL and/or expiration timer expires and becomes invalid, director 511 may remove the additional resources from serving the particular content by providing all requests for the particular content back to the original one or more servers that were initially tasked with the distribution of the particular content.

In some embodiments, controller 501 may define the dynamic thresholds and/or control the allocation of resources based on computed server weights. The weight for each server may be inversely proportional to the server's utilization as determined from the aggregate requests per second, aggregate MBps, and/or other values derived from the collected load statistics. In particular, controller 501 may generate the weight based on formula (1) below:

$$W(s) = 1 + \alpha - 2*\alpha * \frac{BW(s) - BW\min}{BW\max - BW\min} \quad (1)$$

$W(s)$ may correspond to the computed weight for a particular server $(s)$. "$\alpha$" may correspond to a value between 0 and 1, and may control the sensitivity of the weights and/or how aggressively the distribution will be narrowed. A larger $\alpha$ value may provide for a higher sensitivity. For example, an $\alpha$ value of 0.95 would result in the threshold for the most loaded server being much lower than if the $\alpha$ parameter had a value of 0.7. $BW(s)$ may correspond to the current load or utilization of server $(s)$, $BW\min$ may correspond to the lowest load of server $(s)$, and $BW\max$ may correspond to the highest load of server $(s)$. The formula may generate a weight with a value between 0 and 2 that is inversely proportional to the server load or utilization. Controller 501 may then compute each server threshold as:

$$T(s) = \text{base}T * W(s) \quad (2)$$

$T(s)$ may correspond to the threshold that is generated for a particular server $(s)$, and baseT may correspond to a base or default threshold value (e.g., 375 MBps, 500 requests per second, etc.).

A skewness value may also be used to avoid redistributing load when the deviation of the actual server utilization is less than a threshold value of the baseline utilization. For instance, if the load on a particular server deviates from the average and/or median load for servers in a PoP by a value of 0.9-1.1 then no further load balancing or load redistribution will be performed for those servers. The skewness value may be used to prevent an infinite loop of attempting to reach a perfectly balanced load across all servers in a PoP.

Figure 7:
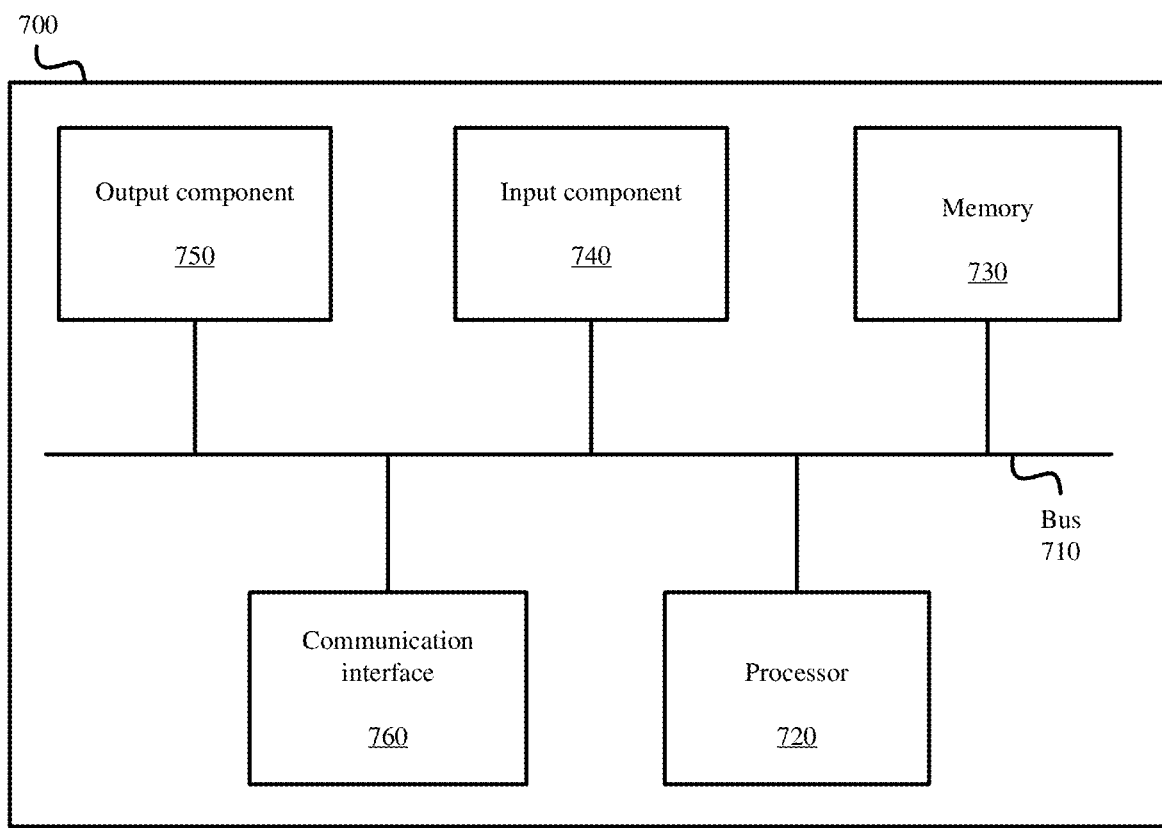
FIG. 7 illustrates example components of one or more devices, according to one or more embodiments described herein.

FIG. 7 is a diagram of example components of device 700. Device 700 may be used to implement one or more of the devices or systems described above (e.g., controller 501, the servers, load balancing and/or director 511, client devices, etc.). Device 700 may include bus 710, processor 720, memory 730, input component 740, output component 750, and communication interface 760. In another implementation, device 700 may include additional, fewer, different, or differently arranged components.

Bus 710 may include one or more communication paths that permit communication among the components of device 700. Processor 720 may include a processor, microprocessor, or processing logic that may interpret and execute instructions. Memory 730 may include any type of dynamic storage device that may store information and instructions for execution by processor 720, and/or any type of non-volatile storage device that may store information for use by processor 720.

Input component 740 may include a mechanism that permits an operator to input information to device 700, such as a keyboard, a keypad, a button, a switch, etc. Output component 750 may include a mechanism that outputs information to the operator, such as a display, a speaker, one or more light emitting diodes ("LEDs"), etc.

Communication interface 760 may include any transceiver-like mechanism that enables device 700 to communicate with other devices and/or systems. For example, communication interface 760 may include an Ethernet interface, an optical interface, a coaxial interface, or the like.

Communication interface 760 may include a wireless communication device, such as an infrared ("IW") receiver, a Bluetooth® radio, or the like. The wireless communication device may be coupled to an external device, such as a remote control, a wireless keyboard, a mobile telephone, etc. In some embodiments, device 700 may include more than one communication interface 760. For instance, device 700 may include an optical interface and an Ethernet interface.

Device 700 may perform certain operations relating to one or more processes described above. Device 700 may perform these operations in response to processor 720 executing software instructions stored in a computer-readable medium, such as memory 730. A computer-readable medium may be defined as a non-transitory memory device. A memory device may include space within a single physical memory device or spread across multiple physical memory devices. The software instructions may be read into memory 730 from another computer-readable medium or from another device. The software instructions stored in memory 730 may cause processor 720 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:
measuring a first amount of load experienced by a first device, wherein the first device distributes a first set of content over a network from a particular site;
measuring a second amount of load experienced by a second device, wherein the second device distributes a second set of content over the network from the particular site;
determining an amount of deviation between the first amount of load and the second amount of load; and
setting different thresholds at which additional resources are allocated to (i) distribute one or more of the first set of content in conjunction with the first device or (ii) distribute the second set of content in conjunction with the second device in response to the amount of deviation.

2. The method of claim 1,
wherein measuring the first amount of load comprises tracking one or more of a first number of requests for the first set of content received at the first device or data served in response to the first number of requests; and
wherein measuring the second amount of load comprises tracking one or more of a second number of requests for the second set of content received at the second device or data served in response to the second number of requests.

3. The method of claim 1 further comprising:
detecting an uneven distribution of load on the first device in response to the first amount of load being greater than the second amount of load;
determining first content from the first set of content imposing at least a particular amount of load on the first device, and second content from the second set of content imposing at least the particular amount of load on the second device; and
allocating resources from a third device or the second device at the particular site to distribute the first content in conjunction with the first device while retaining distribution of the second content entirely within the second device in response to setting the different thresholds.

4. The method of claim 3, wherein setting the different thresholds comprises:
configuring a first threshold for the first device, wherein the first threshold is satisfied by the particular amount of load; and
configuring a second threshold for the second device, wherein the second threshold is larger than the first threshold and is not satisfied by the particular amount of load.

5. The method of claim 1 further comprising:
computing overall load for the particular site based on load experienced by a plurality of devices at the particular site, wherein the plurality of devices comprises the first device and the second device; and
wherein the determining the amount of deviation comprises computing a first deviation between the first amount of load and the overall load, and a second deviation between the second amount of load and the overall load.

6. The method of claim 1 further comprising:
tracking an individual contribution of load from each content of the first set of content to the first amount of load;
comparing the individual contribution of load from each content of the first set of content against a first threshold that is configured for the first device as a result of setting the different thresholds; and
allocating an additional device or resource of the particular site to distribute first content from the first set of content in conjunction with the first device in response to the individual contribution of load from the first content satisfying or exceeding the first threshold.

7. The method of claim 6 further comprising:
distributing second content from the first set of content exclusively from the first device in response to the individual contribution of load from the second content not satisfying or exceeding the first threshold.

8. The method of claim 6 further comprising:
determining a number of additional resources or devices to allocate for distribution of the first content based on a value by which the individual contribution of load from the first content exceeds the first threshold.

9. The method of claim 6, wherein allocating the additional device or resource comprises:
modifying a configuration of a request director for the particular site, wherein the request director receives a plurality of content requests that are directed to the first content, and the request director distributes the plurality of content requests across the first device and the additional device or resource.

10. The method of claim 6 further comprising:
selecting the additional device or resource from a plurality of devices or resources of the particular site based on the additional device or resource being a least loaded device or resource of the plurality of devices or resources; and
shifting part of the individual contribution of load of the first content from the first device to the additional device or resource.

11. The method of claim 1 further comprising:
distributing first content from the first set of content with the first device and an additional resource or device of the particular site in response to an individual load from the first content on the first device exceeding a first threshold that is configured for the first device as a result of setting the different thresholds; and
distributing second content from the second set of content with the second device and an additional resource or device of the particular site in response to an individual load from the second content on the second device exceeding a second threshold that is configured for the second device as a result of setting the different thresholds, and wherein the first threshold is different than the second threshold.

12. The method of claim 11, wherein a difference between the first threshold and the second threshold is based on the amount of deviation between the first amount of load and the second amount of load.

13. The method of claim 11, wherein a difference between the first threshold and the second threshold is based on a difference between the first amount of load and an average load at the particular site, and a difference between the second amount of load and the average load at the particular site.

14. The method of claim 1 further comprising:
tracking an individual load imposed on the first device by each content of the first set of content; and
calculating the first amount of load based on the individual load imposed by each content of the first set of content.

15. The method of claim 1 further comprising:
scaling resources that are allocated to distribute first content from the first set of content in response to load contributed by the first content on the first device exceeding a first threshold configured for the first device as a result of setting the different thresholds; and
scaling resources that are allocated to distribute second content from the second set of content in response to load contributed by the second content on the second device exceeding a different second threshold configured for the second device as a result of setting the different thresholds.

16. A system comprising:
a particular site with at least a first device that distributes a first set of content over a network, and a second device that distributes a second set of content over the network; and
one or more processors configured to:
measure a first amount of load experienced by the first device;
measure a second amount of load experienced by the second device;
determine an amount of deviation between the first amount of load and the second amount of load; and set different thresholds at which additional resources are allocated to (i) distribute one or more of the first set of content in conjunction with the first device or (ii) distribute the second set of content in conjunction with the second device in response to the amount of deviation.

17. The system of claim 16, wherein the one or more processors are further configured to:
   detect an uneven distribution of load on the first device in response to the first amount of load being greater than the second amount of load;
   determine first content from the first set of content imposing at least a particular amount of load on the first device, and second content from the second set of content imposing at least the particular amount of load on the second device; and
   allocate resources from a third device or the second device at the particular site to distribute the first content in conjunction with the first device while retaining distribution of the second content entirely within the second device in response to setting the different thresholds.

18. The system of claim 17, wherein the one or more processors are further configured to:
   configure a first threshold for the first device, wherein the first threshold is satisfied by the particular amount of load; and
   configure a second threshold for the second device, wherein the second threshold is larger than the first threshold and is not satisfied by the particular amount of load.

19. The system of claim 16, wherein the one or more processors are further configured to:
   track an individual contribution of load from each content of the first set of content to the first amount of load;
   compare the individual contribution of load from each content of the first set of content against a first threshold that is configured for the first device as a result of setting the different thresholds; and
   allocate an additional device or resource of the particular site to distribute first content from the first set of content in conjunction with the first device in response to the individual contribution of load from the first content satisfying or exceeding the first threshold.

20. A non-transitory computer-readable medium, storing a plurality of processor-executable instructions to:
   measure a first amount of load experienced by a first device, wherein the first device distributes a first set of content over a network from a particular site;
   measure a second amount of load experienced by a second device, wherein the second device distributes a second set of content over the network from the particular site;
   determine an amount of deviation between the first amount of load and the second amount of load; and
   set different thresholds at which additional resources are allocated to (i) distribute one or more of the first set of content in conjunction with the first device or (ii) distribute the second set of content in conjunction with the second device in response to the amount of deviation.

* * * * *